US009131189B2

(12) United States Patent
Green et al.

(10) Patent No.: US 9,131,189 B2
(45) Date of Patent: Sep. 8, 2015

(54) BROADCAST METADATA COMPRESSION METHOD AND SYSTEM (71) Applicant: Liberty Global Europe Holding B.V., Schiphol-Rijk (NL)

(72) Inventors: Nicholas Green, Wellington (NZ); Simon Elliott, Cranleigh (GB)

(73) Assignee: LIBERTY GLOBAL EUROPE HOLDING B.V., Schiphol-Rijk (NL)

( * ) Notice: Subject to any disclaimer, the term of this patent is extended or adjusted under 35 U.S.C. 154(b) by 389 days.

(21) Appl. No.: 13/652,699

(22) Filed: Oct. 16, 2012

(65) Prior Publication Data
US 2013/0042274 A1 Feb. 14, 2013

Related U.S. Application Data (63) Continuation of application No. PCT/NL2011/050261, filed on Apr. 18, 2011.

(30) Foreign Application Priority Data

Apr. 16, 2010 (EP) ..................................... 10160135

(51) Int. Cl.
*H04N 5/445* (2011.01)
*H04N 21/262* (2011.01)
(Continued)

(52) U.S. Cl.
CPC ....... *H04N 5/44543* (2013.01); *H04N 21/2665* (2013.01); *H04N 21/26283* (2013.01); *H04N 21/482* (2013.01)

(58) Field of Classification Search
CPC .................... H04N 21/2362; H04N 21/26283; H04N 21/2665; H04N 21/462; H04N 21/482–21/4828; H04N 21/84; H03M 7/00; H03M 7/46
USPC ........... 725/39, 44, 48, 52, 54, 59; 341/50, 55
See application file for complete search history.

(56) References Cited

U.S. PATENT DOCUMENTS 5,049,881 A * 9/1991 Gibson et al. ................... 341/95
5,548,338 A 8/1996 Ellis et al.
(Continued)

FOREIGN PATENT DOCUMENTS

WO WO 2006/131746 A2 12/2006

OTHER PUBLICATIONS

International Search Report mailed Sep. 15, 2011 issued in corresponding International Application No. PCT/NL2011/050261 (2 pages).

*Primary Examiner* — An Son P Huynh
(74) *Attorney, Agent, or Firm* — Lucas & Mercanti LLP

(57) ABSTRACT

Broadcast server and method for transmitting electronic program guide data to set top boxes via a broadcast network. The broadcast server is arranged to prepare a list of unique entries and associated identifications of the text items received, and to provide a compressed list to the plurality of set top boxes. The broadcast server repeats the following steps for each text item in the list:

determining whether a next text item has a number of shared consecutive characters at the start in common with a compressed text item from the compressed list, identifying said compressed text item as a source of shared consecutive characters and determining the number of shared consecutive characters;

storing for the next text item an identification, a reference to the source of shared consecutive characters, the number of shared consecutive characters, and the remaining non-shared text in the compressed list.

18 Claims, 2 Drawing Sheets (51) Int. Cl.
*H04N 21/2665* (2011.01)
*H04N 21/482* (2011.01)

(56) References Cited

U.S. PATENT DOCUMENTS

| | | | |
|---|---|---|---|
| 5,627,533 A * | 5/1997 | Clark | 341/51 |
| 5,901,310 A * | 5/1999 | Rahman et al. | 713/1 |
| 6,005,561 A | 12/1999 | Hawkins et al. | |
| 6,047,298 A | 4/2000 | Morishita | |
| 6,081,773 A * | 6/2000 | Hirai et al. | 704/3 |
| 6,121,903 A * | 9/2000 | Kalkstein | 341/63 |
| 6,307,488 B1 * | 10/2001 | Cooper | 341/51 |
| 6,768,818 B2 * | 7/2004 | Friederich et al. | 382/233 |
| 7,574,719 B1 | 8/2009 | Shield et al. | |
| 7,757,251 B2 * | 7/2010 | Gonder et al. | 725/39 |
| 7,861,269 B1 * | 12/2010 | Mohr et al. | 725/48 |
| 7,877,769 B2 * | 1/2011 | Corl | 725/39 |
| 8,280,723 B1 * | 10/2012 | Laaser | 704/10 |
| 8,453,249 B2 * | 5/2013 | Tsuda | 726/26 |
| 8,509,602 B2 * | 8/2013 | Ohde et al. | 386/291 |
| 8,880,698 B2 * | 11/2014 | Foster et al. | 709/226 |
| 2003/0088783 A1 * | 5/2003 | DiPierro | 713/189 |
| 2003/0141993 A1 * | 7/2003 | Baldwin et al. | 341/50 |
| 2004/0002987 A1 * | 1/2004 | Clancy et al. | 707/101 |
| 2004/0073923 A1 * | 4/2004 | Wasserman | 725/46 |
| 2004/0268394 A1 | 12/2004 | Nichols et al. | |
| 2006/0092052 A1 | 5/2006 | Baldwin et al. | |
| 2007/0005629 A1 * | 1/2007 | Tokuda et al. | 707/102 |
| 2007/0164880 A1 * | 7/2007 | Parida et al. | 341/50 |
| 2007/0169111 A1 * | 7/2007 | Block et al. | 717/174 |
| 2008/0181514 A1 * | 7/2008 | Ito | 382/232 |
| 2010/0082626 A1 * | 4/2010 | Tsai et al. | 707/737 |
| 2010/0186043 A1 * | 7/2010 | Yuki et al. | 725/50 |
| 2010/0186143 A1 * | 7/2010 | Khoo | 2/164 |

* cited by examiner

BROADCAST METADATA COMPRESSION METHOD AND SYSTEM

CROSS-REFERENCE TO RELATED APPLICATIONS

This is a Continuation application under 37 CFR 1.53(b) of pending International Application PCT/NL2011/050261 filed Apr. 18, 2011, which in turn claims the benefit under 35 USC 119 of European Patent Application Serial No. 10160135.9 filed Apr. 16, 2010, the entire contents of each of which is incorporated herein by reference.

FIELD OF THE INVENTION

The present invention relates to a method for compressing electronic program guide data to be transmitted in a one-way broadcast network.

PRIOR ART

Electronic program guide data is gathered from various sources, and combined in a broadcast television signal. The EPG data is received by a set top box connectable to a television set, and processed to allow viewing of the electronic program guide on the television set.

American patent application U.S. Pat. No. 6,005,561 discloses an interactive information delivery system, more in particular a head end broadcasting system broadcasting a data stream of media objects. The data is used to disseminate an electronic program guide EPG and is in some embodiments compressed, e.g. using run length encoded data fields or LZW encoding, or by using a code dictionary stored in the end user equipment. In the latter option, frequently occurring phrases are encoded into a dictionary to take advantage of redundant use of program titles and descriptions.

American patent application U.S. Pat. No. 7,574,719 discloses a program guide data compression method and system. The method uses encoding scheme values as compression index values where the encoding scheme values are part of the encoding scheme, but are not used to encode the data. Each word or text part of an EPG is encoded in a dictionary using e.g. an 8-bit encoding scheme wherein words/text parts are indexed using only two bytes.

SUMMARY OF THE INVENTION

The present invention seeks to provide a broadcast metadata compression method and system which has an improved efficiency.

According to the present invention, a method for compressing electronic program guide data to be transmitted in a one-way broadcast network is provided, comprising:
  receiving the program guide data as input data having text items;
  applying a first layer of compression of data by preparing a list of unique entries and associated identifications, the unique entries comprising text items which are mutually different;
  and applying a second layer of compression of data by providing a compressed list by repeating the following steps for each text item in the list of unique entries:
    retrieving a next text item from the list of unique entries;
    determining whether the next text item in the list of unique entries has a number of shared consecutive characters at the start of the next text item in common with any one compressed text item from the compressed list, identifying said compressed text item as a source of shared consecutive characters and determining the number of shared consecutive characters;
    storing for the next text item an identification, a reference to the source of shared consecutive characters, the number of shared consecutive characters, and the remaining non-shared text in the compressed list.

By using this two layer compression technique, the EPG data to be transmitted using a broadcast network is reduced in volume, allowing more efficient transfer of these data. The identifications used in the method may be implemented as actual fields having a number stored therein, or alternatively may be implemented as a position indicator (index) in the relevant list.

In a further aspect of the present invention, a broadcast server is provided for transmitting electronic program guide data to a plurality of set top boxes via a broadcast network to which the broadcast server is connected in operation, the broadcast server being further connected in operation to one or more listing providers to receive the program guide data as input data having text items, and being arranged to apply a first layer of compression of data by preparing a list of unique entries and associated identifications of the text items received, the unique entries comprising text items which are mutually different, and to apply a second layer of compression of data by providing a compressed list to the plurality of set top boxes (4),
wherein provision of the compressed list is accomplished by the broadcast server (8) by repeating the following steps for each text item in the list of unique entries:
  retrieving a next text item from the list of unique entries;
  determining whether the next text item in the list of unique entries has a number of shared consecutive characters at the start of the next text item in common with any one compressed text item from the compressed list, identifying said compressed text item as a source of shared consecutive characters and determining the number of shared consecutive characters;
  storing for the next text item an identification, a reference to the source of shared consecutive characters, the number of shared consecutive characters, and the remaining non-shared text in the compressed list.

Such a broadcast server can be efficiently implemented in a general computer system, thereby providing a very efficient hardware implementation for broadcasting electronic program guide data.

In an even further aspect the present invention relates to a set top box for decoding data received from a broadcast server according to an embodiment of the present invention. The set top box comprises a processor arranged to retrieve data from the received data for an entry in the electronic program guide from a compressed list prepared using a method embodiment of the present invention, the entry in the program guide comprising an identification referring to an entry in the compressed list,
wherein the processor is further arranged to recursively retrieve from the compressed list the non-shared text, a reference to a source and a number of shared consecutive characters associated with the identification, and to add in front of the non-shared text an additional text string comprising the number of shared consecutive characters of the non-shared text retrieved from an entry in the compressed list associated with the reference, until an entry has been retrieved for which the number of shared consecutive characters is equal to zero.

SHORT DESCRIPTION OF DRAWINGS

The present invention will be discussed in more detail below, using a number of exemplary embodiments, with reference to the attached drawings, in which.

DETAILED DESCRIPTION OF EXEMPLARY EMBODIMENTS

In present day television broadcast systems, often use is made of Electronic Program Guides (EPG), which provide to a user information concerning TV programs. EPG-data is transmitted together with TV-signals, nowadays more and more in the form of digital communication.

EPG's or EPG applications in general are designed to allow a user to watch television programs whilst browsing available channel and program information, e.g. for up to eight days ahead. This information can be presented in a multi-channel grid view or a single channel list view on a television screen. The application will allow (where hardware and middleware permits) the setting of reminder memos, recording memos and ongoing recordings for a series of related programmes. Other functionality may include locking/unlocking of channels, setting/unsetting of favourites and signalling of specific channel and program properties (e.g. HD or copy protection).

In some implementations the EPG application has the capability to cache itself on persistent flash storage (e.g. provided as part of a set top box 4, see below), so that it does not need to be loaded from in-band every time it is launched. The EPG application may also do some shorter term caching of its data files on a volatile RAM file system, e.g. again implemented as part of the set top box 4.

Figure 1:
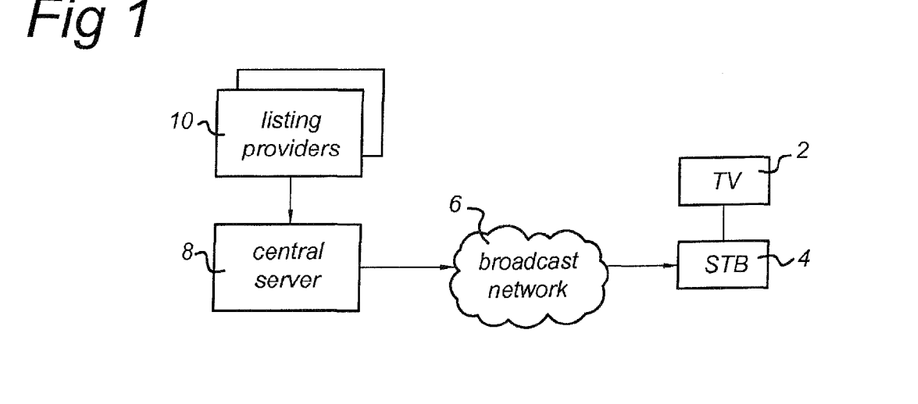
FIG. 1 shows a schematic diagram of a system for collecting, processing and transmitting electronic program guide data.

In FIG. 1 a schematic diagram is shown of elements of a system to deliver an EPG to the end user. The end user is watching a television screen on a television set 2, which is connected to a set top box 4. A set top box 4 is a low CPU end device, which can transform a signal received from a broadcast network 6 into a signal suitable for the television set 2 (i.e. audio and video data, e.g. in the form of an analogue or digital signal). The set top box 4 may be integrated with and form a part of the television set 2.

In general, the broadcast network 6 is a one-way network, sending out a signal, or a set of signals, from a central (broadcast) server 8 to a multitude of set top boxes 4 connected to the broadcast network 6. The broadcast signal comprises the audio and video information of a (large) number of television channels, and also additional data. The additional data may comprise data relating to an EPG, i.e. data which is transformed by the set top box 4 from binary data to program guide data to be displayed on the television set 2.

The transfer of the EPG data requires a part of the bandwidth available in the broadcast network 6. The broadcast network 6 may be based on radio transmission (VHF/UHF band analogue transmission, digital transmission), a cable network, or a data communication network, e.g. based on the internet protocol IP. Efficient use of data transfer may reduce the amount of bandwidth required for transfer of the EPG data.

Furthermore, as shown in the exemplary embodiment of FIG. 1, the central server 8 is connected to a number of providers of listing data 10. As an example, such a provider 10 may be a television broadcast company which makes available their listing of TV programs to the TV broadcast server 8 in a computerized manner. E.g. the providers of listing data 10 deliver their data in the form of raw XML formatted data to the central server 8 using FTP. The data from the listing providers 10 is processed by the central server 8 and added to the broadcast signal for delivery via the broadcast network 6 to the (multitude of) set top boxes 4. E.g. the central server 8 combines the received XML data with other data (advertisements, menu data, etc.) and transforms it into a binary data file for transmission.

A major part of the EPG data comprises text for titles and synopses of scheduled TV events. A TV event is being defined as a scheduled program with a channel identification, a start and finish time, or a start time and scheduled duration, and further data, e.g. a code for categories. To minimise the required bandwidth and memory requirements the titles and synopses data will undergo one or two layers of compression according to embodiments of the present invention. This may be executed in addition to other data compression or signal modulation techniques applied in broadcast of TV signals.

In a first layer of compression, executed e.g. by the central server 8 as depicted in FIG. 1, first the listing data is received as input data having text items, e.g. in the form of consecutive entries of events with associated data such as title text and synopsis text. The text items are strings of characters, e.g. provided in XML format. From the listing of events, a title list and a synopsis list is composed (by the central server 8), each comprising unique entries and associated identifications, as depicted in the flow diagram of FIG. 2. A unique entry is defined as an entry having characters different from all the other entries. Each event can then be referenced by using the identification.

Figure 2:
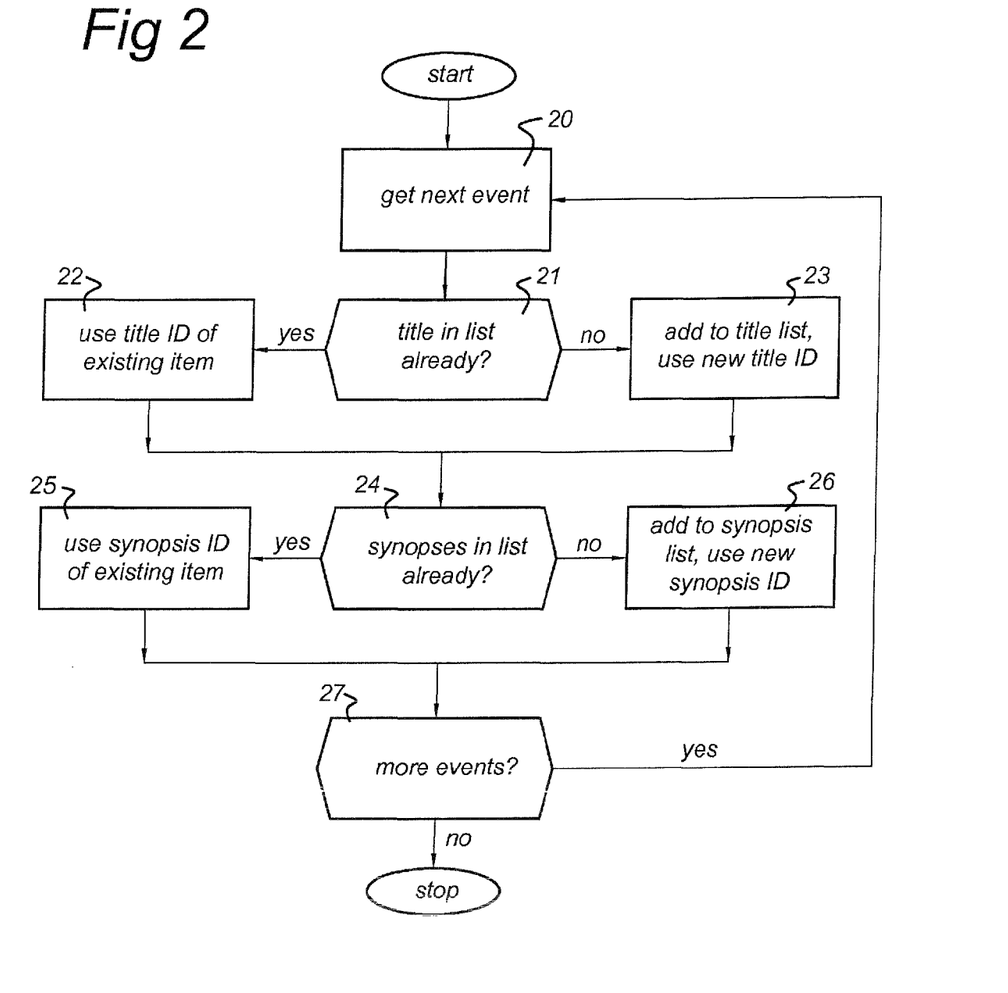
FIG. 2 shows a flow diagram of an embodiment of a first layer of compression according to the present invention.

Starting from the first entry of the event listing (title list) a next entry is retrieved in block 20, and a check is done whether or not the text of that next entry is already present in the title list (block 21). If the text is already in the title list, the relevant title identification is used for that event, and the flow progresses to block 24. If not, the title text is added to the title list, with a new title identification in block 23, after which the flow progresses to block 24. In block 24 the synopsis for that event is retrieved from the event listing, and a check is made whether or not that synopsis text is already in the synopsis list. If this is the case, again, the associated synopsis identification is used in the event listing (block 25) after which the flow progresses to block 27. If not, the synopsis text is added to the synopsis list with a new synopsis identification in block 26, after which the flow progresses to block 27. In block 27 a check is performed to see whether further events exist in the event listing. If so, the flow returns to block 20, if not, the flow stops at block 28.

At the end of the first compression step, a title list and a synopsis list is provided each with identifications (ID numbers), and unique text entries, and in the event listing, the title text and synopsis text is replaced by the associated identification numbers. Already, the amount of EPG data can have decreased by deleting copies of identical texts in the titles and synopsis, even though identification numbers are added. Especially when the EPG data comprises a lot of series events (with same title text) a decrease in EPG data amount can be achieved. The identifications (ID numbers) may be explicit, i.e. present as an actual number, or implicit, e.g. using an index pointing to a position in a list.

In a second layer of compression, possible duplication of text parts is exploited to reduce the amount of EPG data to be transmitted, but only for the longest common prefix, i.e. the start of the text entry. Text entries in both the title list as in the synopsis list are checked for the presence of duplicated text. This is depicted schematically in the flow chart of FIG. 3, which is used both for the title list with unique entries and for the synopsis list with unique entries.

Figure 3:
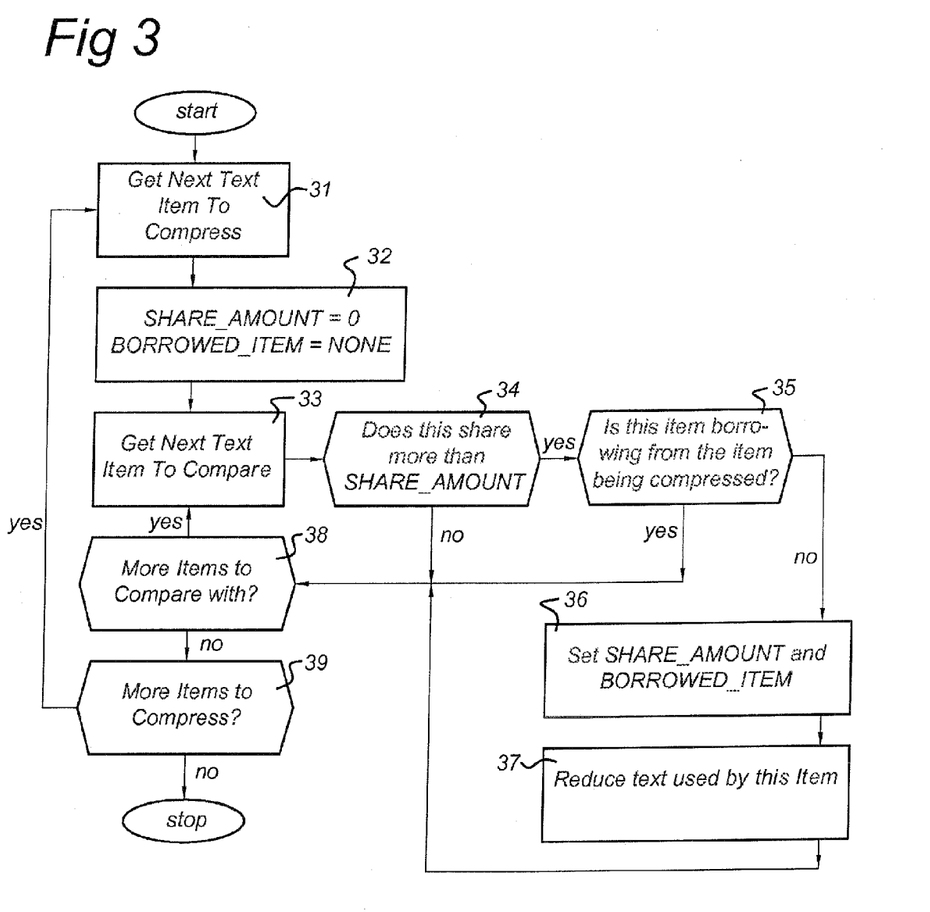
FIG. 3 shows a flow diagram of an embodiment of a second layer of compression according to the present invention.

In general terms, a compressed list is provided by repeating the following steps for each text item in the list:
retrieving a next text item from the list of unique entries;
determining whether the next text item in the list of unique entries has a number of shared consecutive characters at the start of the next text item in common with any one compressed text item from the compressed list, identifying said compressed text item as a source of shared consecutive characters and determining the number of shared consecutive characters;
storing for the next text item an identification, a reference to the source of shared consecutive characters (this reference can be same as identification, when zero characters of shared text exist), the number of shared consecutive characters (or copy count), and the remaining non-shared text in the compressed list.

This time, the event listing is unaffected (and maintained in the compressed list), as this event listing only comprises references to the identification numbers used in the title list and synopsis list. However, in the title list and in the synopsis list, two columns are added, i.e. source (reference to the source of shared consecutive characters) and copy count.

In the source field, an identification number is given, which identifies an earlier entry in the compressed list which shares a prefix of the title or synopsis. If no text is shared (which is e.g. the case for the first entry in the list), the source field refers to the corresponding identification number of that entry. Copy count is a value, which indicates the number of the consecutive characters shared between this entry and the entry referred to. If no text is shared, the copy count is set to zero. In the following this is explained in more detail for entries in the synopsis list, however, similar steps are also applied in the title list.

To take advantage of duplication, text entries make reference to other text entries to copy characters from. For instance:
Synopsis 1: "Friends is a sitcom based in New York. Today Joey discovers his feelings for Rachel."
Synopsis 2: "Friends is a sitcom based in New York. Ross loses his pet monkey."

In this case, Synopsis 2 would store a reference to Synopsis 1, a copy count of 39, and the text "Ross loses his pet monkey." It is important to note that this is not full tokenization of the strings like LZW compression; it is only the prefix of the text string that is shared. The algorithm used furthermore assures that there are no circular references between shared text items.

The flow of the algorithm is depicted graphically in the flow diagram of FIG. 3. From either the title list or the synopsis list, a next item to compress is retrieved (block 31), after which two test variables (SHARE_AMOUNT and BORROWED_ITEM) are initialized to 0 and NONE, respectively in block 32. From the part of the title or synopsis list already compressed, a next item to compare the retrieved item with is retrieved in block 33. A check is performed in block 34 ('does this share more than the value of SHARE_AMOUNT') and if not, the flow continues to a next decision block 38 ('more items to compare with?' (in compressed list)), after which the flow returns to block 33 (in case affirmative) or block 39 (in case answer is no). It is noted that of course a first item in the list can not be subjected to this steps, as it is the first item and cannot be compared to another item.

If the check in block 34 is positive, the flow progresses to decision block 35, in which a check is performed to determine if the item checked against is borrowing text from the item being compressed. If affirmative, the flow progresses to block 38 (see before, the item checked against will be compressed in a later cycle of the algorithm), and if not, the algorithm determines in block 36 the value of SHARED_AMOUNT and the value of BORROWED_ITEM, and in block 37 reduces the text for the present item with the BORROWED_ITEM (i.e. takes away the first 'SHARE_AMOUNT' characters from the present entry text). After this, the flow again continues with block 38 to make further comparisons.

In block 38, it is checked whether there is a next item to compare with from the compressed list. In an embodiment, the compressed text item is retrieved from the compressed list in sequence of first to last compressed text item. This assures an efficient compression, also with regard to preventing redundant steps in a subsequent decompression of the data.

In block 39, the list is checked whether or not there are more entries to be compressed. If there are, the flow returns to block 31 and all steps are repeated, if not, the algorithm is ready.

As a result of the two-step compression, a compressed title/synopsis list is obtained with three columns of numbers and one column of text, e.g. as follows:

| ID | Source | Copy Count | Non-shared Text |
|---|---|---|---|
| 0 | 0 | 0 | Ross loses his pet monkey. |
| 1 | 0 | 5 | falls in love with Rachel. |
| 2 | 0 | 5 | and Monica go dancing. |

In this example, the second and third entry both share the first five characters of entry '0', i.e. the character string 'Ross'. The first column may be actually present, or an implicit reference may be implemented, e.g. using an index number to refer to a position in the compressed title/synopsis list.

To decompress the text once all EPG data is received on the set top box 4, a recursive algorithm will be used to build it up piece by piece, starting at the end of a text string. As a further example the following compressed list is given:

| ID | Source | Copy Count | Non-shared Text |
|---|---|---|---|
| 0 | 0 | 0 | The quick brown fox |
| 1 | 0 | 0 | jumped over |
| 2 | 1 | 0 | the lazy dog |

Figure 4:
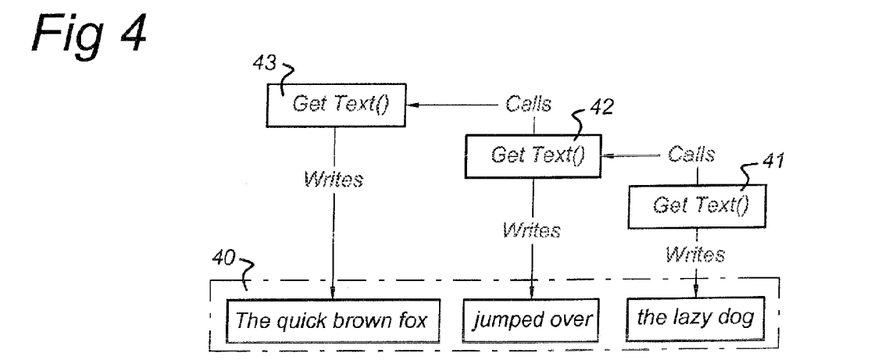
FIG. 4 shows a schematic presentation of a decompression method according to an embodiment of the present invention.

The decompression is depicted graphically in FIG. 4. A first call 41 (Get Text) gets the text string as available in the last entry with the proper identification (in this example ID=2, 'the lazy dog'). This part is written in a temporary buffer, and a next call 42 is made using the source (1) and copy count data of the entry. This retrieves the text string 'jumped over' from entry with ID=1, which is added in front of the text already present in the buffer. Then a further call 43 is made using source ID=0, and the text string 'The quick brown fox' is added in front of the already present text in the buffer. As the source ID referred to in this entry is the same as the entry ID, the algorithm stops. Again, the first column (ID) may be actually present, or an implicit reference may be implemented, e.g. using an index number to refer to a position in the compressed list.

In more general terms, decompression relates to retrieving data for an entry in the electronic program guide from a compressed list prepared using an embodiment of the compression method as described above. The entry in the program guide comprises an identification referring to an entry in the compressed list. In a recursive manner, the non-shared text, a reference to a source and a number of shared consecutive characters associated with the identification are retrieved from the compressed list. In front of the non-shared text an additional text string is added comprising the number of shared consecutive characters of the non-shared text retrieved from an entry in the compressed list associated with the reference. This is executed until an entry has been retrieved for which the number of shared consecutive characters is equal to zero.

It is noted that there are no redundant steps in the decompression. For any text item, it's source text item must have inside its non-borrowed section of text at least one character that is used by the first text item.

Example of a possible problem:

| ID | Original Text | Source | Copy Count | Non-shared Text |
|---|---|---|---|---|
| 0 | Ross loses his pet monkey. | 0 | 0 | Ross loses his pet monkey. |
| 1 | Ross falls in love with Rachel. | 0 | 5 | falls in love with Rachel. |
| 2 | Ross and Monica go dancing. | 1 | 5 | and Monica go dancing. |

As you can see, there is no benefit to have item 2 borrowing from item 1 since the text it needs from item 1 is in fact entirely borrowed from item 0. A better result is to have item 2 borrowing the text directly from item 0. The correct compressed list should thus be:

| ID | Original Text | Source | Copy Count | Non-shared Text |
|---|---|---|---|---|
| 0 | Ross loses his pet monkey. | 0 | 0 | Ross loses his pet monkey. |
| 1 | Ross falls in love with Rachel. | 0 | 5 | falls in love with Rachel. |
| 2 | Ross and Monica go dancing. | 1 | 5 | and Monica go dancing. |

When following the algorithm as shown graphically in FIG. 4, this situation should not happen, as a present entry (e.g. ID=2) is first compared with the first item (ID=0) of the already compressed list. After the first run, there are more items to compare with (block 38, ID=1), but at that moment ID=2 and ID=1 do not share any text anymore.

Again, in the embodiment shown, the identification ID is present in the list, however, in a further embodiment this identification can be made implicit, e.g. using an index reference.

As an alternative, the compressed list may be rechecked for possible occurrence of redundant steps. This may be accomplished by having a further run through the compressed list to check whether such duplications exist, and to change the reference to an earlier identification if necessary.

Based on tests performed with near to real data the compression algorithms according to the present invention embodiment achieve between 66% and 71% compression. Data sets used for testing range between 2.3 and 5 megabytes of data, and after compressing them they become 0.8 and 1.4 megabytes respectively.

Since the compression algorithms according to the present invention leaves the data in a usable form, it means that all of the EPG data can be stored in memory on the set top box 4 instead of loading modules in the set top box 4 on an as needed basis. This is especially important for the Video Window as the EPG application will need to tune to the last in-list station and stay there for the duration of the Video Window showing (which is to say for the duration of the EPG application).

The text lists for both the titles and for the synopses may be structured in the form shown in the table above, i.e. for each entry, an ID is given (explicit or implicit), a source reference, a copy count value, and an unshared text field. As the unshared text may vary over a large range of number of characters, an alternative structure may be provided, where all text is at the end of a file as a sequence of text items separated by a NULL character, and the unshared text field is replaced by a pointer to or an offset of the relevant position in the sequence of text items. More in general, the compressed list is a binary file which comprises at its end a sequence of non-shared text entries separated by a NULL character, and at its start a sequence of entries with a fixed length format for identification, reference to the source of shared consecutive characters, number of shared consecutive characters, and a pointer (e.g. a text reference or an offset value indicating how many NULL characters should be skipped) to the associated non-shared text entry.

The EPG data is transferred via the broadcast network 6, e.g. in the form of binary files. The following details for the binary structures are used in the files. All numbers are encoded as big endian, and all strings/text data are single byte arrays, terminated with a NULL character. This includes text data at the end of the binary files.

The text items are grouped in text lists, both for a Title Table and a Synopsis Table. A text list comprises the definition of one piece of text in a compressed format. These items are e.g. sorted by their whole text (combination of all borrowed text plus its own text element), in alphabetical order. This is summarized in the following structure:

| Field Name | Description | Data Type | Bytes |
|---|---|---|---|
| SourceIndex | Index (0 based) of Text Item to borrow characters from. If not copying characters from anywhere then it should refer to itself. | Unsigned short | 2 |
| CopyCount | Number of bytes to copy If not copying bytes from anywhere then this must be zero. | Unsigned short | 2 |
| Text | Unshared text, to add to the end of the copied characters. Stored as an offset into the file, pointing towards the first character of the NULL terminated string. | Unsigned integer | 4 |
| Total | | | 8 |

A header may precede the list of Text Items, e.g. using the following format:

| Field Name | Description | Data Type | Bytes |
|---|---|---|---|
| Timestamp | The date/time that the current dataset was generated. | Time Stamp | 4 |
| StartIndex | The index number of the first element in the list. All numbers after the first are assumed to be higher by one. If there are no items in this list (ItemCount = 0) then this should be 0. | Unsigned short | 2 |
| ItemCount | Count of items in the list. | Unsigned short | 2 |
| Total | | | 8 |

In all, structuring the text data for an EPG application in the manner described provides a very efficient transfer of EPG data, both in the bandwidth needed to transmit the EPG data over the broadcast network 6, as in retrieving the EPG data in the set top box 4 for display on the television set 2.

Aspects of the present invention may be implemented with a distributed computer system operating environment, together providing e.g. the functionality of the central or broadcast server 8. In a distributed computing environment, tasks may be performed by remote computer devices that are linked through communications networks. The distributed computing environment may include client and server devices that may communicate either locally or via one or more computer networks. Embodiments of the present invention may comprise special purpose and/or general purpose computer devices that each may include standard computer hardware such as a central processing unit (CPU) or other processing means for executing computer executable instructions, computer readable media for storing executable instructions, a display or other output means for displaying or outputting information, a keyboard or other input means for inputting information, and so forth. Examples of suitable computer devices include hand-held devices, multiprocessor systems, microprocessor-based or programmable consumer electronics, networked PCs, minicomputers, mainframe computers, and the like.

Some of the invention embodiment have been described above in the general context of computer-executable instructions, such as program modules, that are executed by a processing device, which is part of e.g. the set top box 4. Generally, program modules include routines, programs, objects, components, data structure definitions and instances, etc, that perform particular tasks or implement particular abstract data types. Typically the functionality of the program modules may be combined or distributed as desired in various environment.

Embodiments within the scope of the present invention also include computer readable media having executable instructions. Such computer readable media can be any available media that can be accessed by a general purpose or special purpose computer. By way of example, and not limitation, such computer readable media can comprise RAM, ROM, EEPROM, CD-ROM or other optical disk storage, magnetic disk storage or other magnetic storage devices, or any other medium which can be used to store the desired executable instructions and which can be accessed by a general purpose or special purpose computer. Combinations of the above should also be included within the scope of computer readable media. Executable instructions comprise, for example, instructions and data which cause a general purpose computer, special purpose computer, or special purpose processing device to perform a certain function or group of functions.

The present invention has been described above using a detailed description of embodiments, with reference to the attached drawings. In these embodiments, elements may be replaced by equivalent elements providing a similar functionality. The scope of the invention is determined by the language of the claims as attached and its equivalents. The used reference signs are referring to the embodiments described above and are not intended to limit the scope of the claims in any manner.

The invention claimed is:

1. A method for compressing electronic program guide data to be transmitted in a broadcast network, comprising:

receiving by a computing device at a broadcast server, the electronic program guide data as input data having a plurality of character strings from a plurality of listing data providers;

applying by the computing device, a first layer of compression of the electronic program guide data by preparing a list of unique entries and associated identifications for the input data, the unique entries comprising character strings which are mutually different; and applying by the computing device, a second layer of compression of the electronic program guide data by providing a compressed list by repeating the following steps for each character string in the list of unique entries:

retrieving a next character string from the list of unique entries;

determining for the next character string in the list of unique entries a largest number of shared consecutive prefix characters in common with consecutive prefix characters of a compressed character string from the compressed list;

responsive to determining for the next character string in the list of unique entries which has the largest number of shared consecutive prefix characters in common with consecutive prefix characters of said compressed character string from the compressed list, identifying said compressed character string from the compressed list as a source of the largest number of shared consecutive prefix characters for the next character string and determining the largest number of shared consecutive prefix characters for the next character string; and storing for the next character string: an identification, a reference to the source of the largest number of shared consecutive prefix characters, a number of the largest number of shared consecutive prefix characters, and the remaining non-shared character string in the compressed list;

wherein the compressed list is a binary file, the binary file comprises at its end a sequence of non-shared character strings for entries of the compressed list, wherein the sequence of non-shared character strings separated by a NULL character, and the binary file comprises at its start a sequence of entries with a fixed length format for identification, reference to source of shared consecutive prefix characters, number of shared consecutive prefix characters, and a pointer to associated non-shared character string.

2. The method of claim 1, wherein the input data comprises title data and synopsis data; and a title list, synopsis list, compressed title list and compressed synopsis list are provided.

3. The method of claim 1, wherein the compressed character string is retrieved from the compressed list in sequence of first to last compressed character string in the compressed list.

4. The method of claim 1, wherein the input data is provided in XML format.

5. A method for providing electronic program guide data, comprising retrieving data for an entry in the electronic program guide from a compressed list prepared at a broadcast server, the entry in the electronic program guide comprising an identification referring to an entry in the compressed list, the method comprising:

recursively retrieving from the compressed list a non-shared character string, a reference to a source and a number of shared consecutive prefix characters associated with the identification, and adding in front of the non-shared character string an additional character string comprising the number of shared consecutive prefix characters of the non-shared character string retrieved from the entry in the compressed list associated with the reference, until the entry has been retrieved for which the number of shared consecutive prefix characters is equal to zero;

wherein the compressed listed prepared at the broadcast server comprising:

receiving by a computing device at the broadcast server, electronic program guide data as input data having a plurality of character strings from a plurality of listing data providers;

applying by the computing device, a first layer of compression of the electronic program guide data by preparing a list of unique entries and associated identifications for the input data, the unique entries comprising character strings which are mutually different; and applying by the computing device, a second layer of compression of the electronic program guide data by providing the compressed list by repeating the following steps for each character string in the list of unique entries:

retrieving a next character string from the list of unique entries;

determining for the next character string in the list of unique entries a largest number of shared consecutive prefix characters in common with consecutive prefix characters of a compressed character string from the compressed list;

responsive to determining for the next character string in the list of unique entries which has the largest number of shared consecutive prefix characters in common with consecutive prefix characters of said compressed character string from the compressed list, identifying said compressed character string from the compressed list as a source of the largest number of shared consecutive prefix characters for the next character string and determining the largest number of shared consecutive prefix characters for the next character string; and storing for the next character string: an identification, a reference to the source of the largest number of shared consecutive prefix characters, a number of the largest number of shared consecutive prefix characters, and the remaining non-shared character string in the compressed list;

wherein the compressed list is a binary file, the binary file comprises at its end a sequence of non-shared character strings for entries of the compressed list, wherein the sequence of non-shared character strings separated by a NULL character, and the binary file comprises at its start a sequence of entries with a fixed length format for identification, reference to source of shared consecutive prefix characters, the number of shared consecutive prefix characters, and a pointer to associated non-shared character string.

6. The method of claim 5, wherein the input data comprises title data and synopsis data; and a title list, synopsis list, compressed title list and compressed synopsis list are provided.

7. The method of claim 5, wherein the compressed character string is retrieved from the compressed list in sequence of first to last compressed character string in the compressed list.

8. A broadcast server for transmitting electronic program guide data to a plurality of set top boxes via a broadcast network to which the broadcast server is connected in operation, the broadcast server being further connected in operation to one or more listing data providers to receive the electronic program guide data as input data having a plurality of character strings, and the broadcast server being arranged to apply a first layer of compression of the electronic program guide data by preparing a list of unique entries and associated identifications of the plurality of character strings received, the unique entries comprising character strings which are mutually different, and the broadcast server also being arranged to apply a second layer of compression of the electronic program guide data by providing a compressed list to the plurality of set top boxes, wherein provision of the compressed list is accomplished by the broadcast server by repeating the following steps for each character string in the list of unique entries:

retrieving by a computing device at the broadcast server, a next character string from the list of unique entries;

determining by the computing device, for the next character string in the list of unique entries a largest number of shared consecutive prefix characters in common with consecutive prefix characters of a compressed character string from the compressed list;

responsive to determining for the next character string in the list of unique entries which has the largest number of shared consecutive prefix characters in common with consecutive prefix characters of said compressed character string from the compressed list, identifying said compressed character string from the compressed list as a source of the largest number of shared consecutive prefix characters for the next character string and determining the largest number of shared consecutive prefix characters for the next character string; and storing for the next character string: an identification, a reference to the source of the largest number of shared consecutive prefix characters, a number of the largest number of shared consecutive prefix characters, and the remaining non-shared character string in the compressed list;

wherein the compressed list is a binary file, the binary file comprises at its end a sequence of non-shared character strings for entries of the compressed list, wherein the sequence of non-shared character strings separated by a NULL character, and the binary file comprises at its start a sequence of entries with a fixed length format for identification, reference to the source of shared consecutive prefix characters, a number of shared consecutive prefix characters, and a pointer to associated non-shared character string.

9. The broadcast server of claim 8, wherein the input data received from the one or more listing data providers comprises title data and synopsis data, and a compressed title list and compressed synopsis list are broadcast by the broadcast server using the broadcast network.

10. The broadcast server of claim 8, wherein the broadcast server is arranged to retrieve the compressed character string from the compressed list in sequence of first to last compressed character string in the compressed list.

11. A set top box for decoding data received in a compressed list from a broadcast server utilized with a broadcast network, the set top box decoding the data received in the compressed list from the broadcast server for display on a television set connectable to the set top box, the set top box comprising a processor arranged to retrieve data from the received data for an entry in an electronic program guide from the compressed list prepared at the broadcast server, the entry in the electronic program guide comprising an identification referring to an entry in the compressed list, wherein the processor is further arranged to recursively retrieve from the compressed list a non-shared character string, a reference to a source and a number of shared consecutive prefix characters associated with the identification, and to add in front of the non-shared character string an additional character string comprising the number of shared consecutive prefix characters of the non-shared character string retrieved from the entry in the compressed list associated with the reference, until the entry has been retrieved for which the number of shared consecutive prefix characters is equal to zero;

wherein the compressed listed prepared at the broadcast server comprising:

receiving by a computing device at the broadcast server, electronic program guide data as input data having a plurality of character strings from a plurality of listing data providers;

applying by the computing device, a first layer of compression of the electronic program guide data by preparing a list of unique entries and associated identifications for the input data, the unique entries comprising character strings which are mutually different; and applying by the computing device, a second layer of compression of the electronic program guide data by providing the compressed list by repeating the following steps for each character string in the list of unique entries:

retrieving a next character string from the list of unique entries;

determining for the next character string in the list of unique entries a largest number of shared consecutive prefix characters in common with consecutive prefix characters of a compressed character string from the compressed list;

responsive to determining for the next character string in the list of unique entries which has the largest number of shared consecutive prefix characters in common with consecutive prefix characters of said compressed character string from the compressed list, identifying said compressed character string from the compressed list as a source of the largest number of shared consecutive prefix characters for the next character string and determining the largest number of shared consecutive prefix characters for the next character string; and storing for the next character string: an identification, a reference to the source of the largest number of shared consecutive prefix characters, a number of the largest number of shared consecutive prefix characters, and the remaining non-shared character string in the compressed list;

wherein the compressed list is a binary file, the binary file comprises at its end a sequence of non-shared character strings for entries of the compressed list, wherein the sequence of non-shared character strings separated by a NULL character, and the binary file comprises at its start a sequence of entries with a fixed length format for identification, reference to source of shared consecutive prefix characters, the number of shared consecutive prefix characters, and a pointer to associated non-shared character string.

12. The set top box of claim 11, wherein the input data received from the plurality of listing data providers comprises title data and synopsis data; and a compressed title list and compressed synopsis list are broadcast by the broadcast server using the broadcast network.

13. The set top box of claim 11, wherein the broadcast server is arranged to retrieve the compressed character string from the compressed list in sequence of first to last compressed character string in the compressed list.

14. A non-transitory computer-readable medium having computer-executable instructions for performing a method comprising:

receiving by a computing device at a broadcast server, electronic program guide data as input data having a plurality of character strings from a plurality of listing data providers;

applying by the computing device, a first layer of compression of the electronic program guide data by preparing a list of unique entries and associated identifications for the input data, the unique entries comprising character strings which are mutually different; and applying by the computing device, a second layer of compression of the electronic program guide data by providing a compressed list by repeating the following steps for each character string in the list of unique entries:

retrieving a next character string from the list of unique entries;

determining for the next character string in the list of unique entries a largest number of shared consecutive prefix characters in common with consecutive prefix characters of a compressed character string from the compressed list;

responsive to determining for the next character string in the list of unique entries which has the largest number of shared consecutive prefix characters in common with consecutive prefix characters of said compressed character string from the compressed list, identifying said compressed character string from the compressed list as a source of the largest number of shared consecutive prefix characters for the next character string and determining the largest number of shared consecutive prefix characters for the next character string; and storing for the next character string: an identification, a reference to the source of the largest number of shared consecutive prefix characters, a number of the largest number of shared consecutive prefix characters, and the remaining non-shared character string in the compressed list;

wherein the compressed list is a binary file, the binary file comprises at its end a sequence of non-shared character strings for entries of the compressed list, wherein the sequence of non-shared character strings separated by a NULL character, and the binary file comprises at its start a sequence of entries with a fixed length format for identification, reference to source of shared consecutive prefix characters, a number of shared consecutive prefix characters, and a pointer to associated non-shared character string.

15. The non-transitory computer-readable medium of claim 14, wherein the input data comprises title data and synopsis data; and a title list, synopsis list, compressed title list and compressed synopsis list are provided.

16. The non-transitory computer-readable medium of claim 14, wherein the compressed character string is retrieved from the compressed list in sequence of first to last compressed character string in the compressed list.

17. The non-transitory computer-readable medium of claim 14 further comprising computer-executable instructions for retrieving data for an entry in the electronic program guide from the compressed list, the entry in the electronic program guide comprising an identification referring to an entry in the compressed list, and for:

recursively retrieving from the compressed list a non-shared character string, a reference to a source and a number of shared consecutive prefix characters associated with the identification, adding in front of the non-shared character string an additional character string comprising the number of shared consecutive prefix characters of the non-shared character string retrieved from the entry in the compressed list associated with the reference, until the entry has been retrieved for which the number of shared consecutive prefix characters is equal to zero.

18. The non-transitory computer-readable medium of claim 14, wherein the input data is provided in XML format.

* * * * *